United States Patent [19]

De Jonge

[11] 3,836,895

[45] Sept. 17, 1974

[54] OPTO-MAGNETIC MEMORY

[75] Inventor: Frederik Ate De Jonge, Emmasingel, Eindhoven, Netherlands

[73] Assignee: U.S. Philips Corporation, New York, N.Y.

[22] Filed: Nov. 7, 1972

[21] Appl. No.: 304,389

[30] Foreign Application Priority Data

Nov. 13, 1971 Netherlands ........................ 7115633

[52] U.S. Cl. .................... 340/174 YC, 340/174 PM, 340/174 SC, 340/174 TF

[51] Int. Cl. .......................... G11c 11/14, G11c 11/42

[58] Field of Search ................ 340/174 TF, 174 YC; 346/74 MT; 360/59

[56] References Cited

UNITED STATES PATENTS 3,786,452 1/1974 Geusic ........................... 340/174 TF 3,787,825 1/1974 De Jonge ........................ 340/174 TF

OTHER PUBLICATIONS

IBM Technical Disclosure Bulletin, Vol. 13, No. 7, Dec. 1970 pg. 1788–1790.

*Primary Examiner*—James W. Moffitt

*Attorney, Agent, or Firm*—Frank R. Trifari; Carl P. Steinhauser

[57] ABSTRACT

A device for the magnetic storage of data which comprises a plate of a magnetizable material having a periodic structure of magnetic domains. Recording data occurs with an external magnetic field having a value at which 2 types of magnetic domains having different sizes can occur. The size of a magnetic domain can be varied by selective irradiation with light.

4 Claims, 7 Drawing Figures

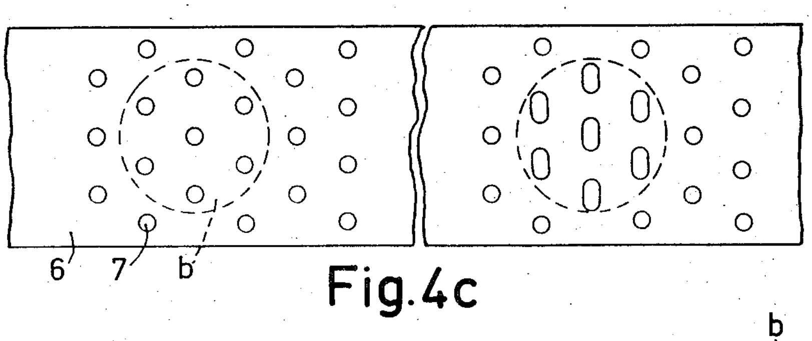
Fig.4c
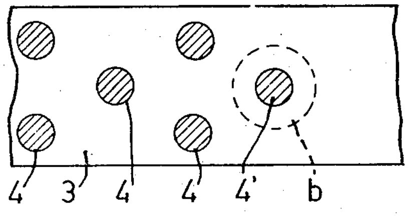
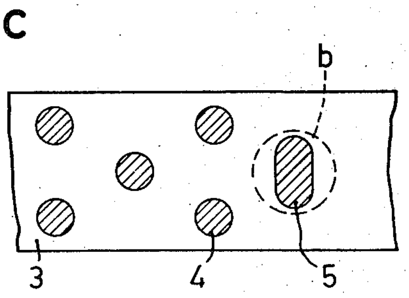
Fig.4a Fig 4b
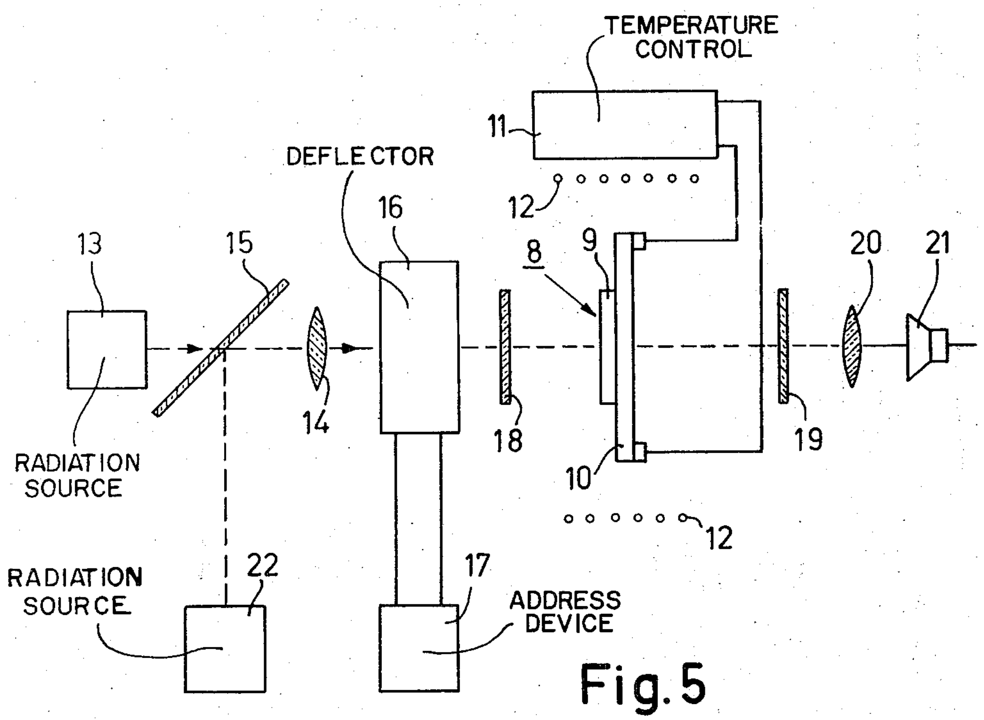
Fig.5

OPTO-MAGNETIC MEMORY

The invention relates to a device for the storage of data comprising a plate of a magnetizable material having an easy axis of magnetization which extends substantially normal to the plane of the plate and having a compensation temperature for the magnetisation. The plate comprises a number of data storage places. The device further comprises a source of radiation and a deflection and address system to instantaneously increase the temperature of a desirable data storage place by means of a beam of radiation energy. Also provided is a magnetization device to magnetize the plate, and a temperature control device to keep the plate at a substantially constant temperature.

Such a device is known from the U.S. Pat. No. 3,164,816. The device used in this patent uses the property of certain magnetizable materials, the crystal structure of which is characterized by sublattices having opposite magnetization (so-called ferromagnetic material), wherein the spontaneous magnetization as a function of the temperature, shows a point at which the resultant of the opposite magnetizations of the sublattices passes through zero. This point is termed the compensation point. A strong increase of the coercive force is associated with the passage through zero of the resultant of the magnetization and it is this strong temperature dependence of the coercive force on which the application possibilities of the said materials are actually based. In the known device, a plate of ferric magnetic material is kept at a temperature equal to the compensation temperature, and a pulsatory beam of radiation energy is directed onto a desired data storage place to temporarily increase the temperature at that area and thus produce a temporary spontaneous magnetization of the irradiated place. Simultaneously, a pulsatory magnetic field having a suitable field strength is switched on, to orient the magnetisation of the irradiated place in accordance with the presented binary information in a positive or negative sense, without the adjacent places being influenced. In this manner, binary information in the form of an orientation of the magnetization is stored in a number of successive places by the combined action of a radiation beam and a magnetic field. Reading of the stored information is possible by means of a polarized light beam. Upon transmission or reflection, the plane of polarization will be rotated clockwise by one orientation of the magnetization, and be rotated counter-clockwise by the other orientation of the magnetization. By placing an analyser in the light path, only light is transmitted, the polarization of which, is rotated in one of the said two directions. This light impinges upon a photo-detector the output signal of which, that is to say the presence or absence of light, represents the stored data. In this connection, it is of importance to note that rotation of the plane of polarization takes place inspite of the fact that the net magnetization of the material at the compensation temperature is zero. This is because the rotation depends upon the orientation of the magnetization of one of the magnetic sub-lattices.

This known device for storing data exhibits the following drawbacks.

The size of a data storage place is not accurately determined: irradiated regions can develop in a different manner as a result of the fact that there exists a great difference in average magnetization between (A) a region having positively oriented magnetization which is surrounded by regions having negatively oriented magnetization, and (B) a region having positively oriented magnetization which is surrounded by regions having likewise positively oriented magnetization. In itself, an irradiated place can moreover develop beyond the light spot, if the material used does not have a very high homogeneous coercive force. On the one hand, however, such materials are difficult to manufacture, while on the other hand, the coercive force may not become too large either, in connection with the switching fields required for orienting the magnetization.

A further drawback is that writing proceeds comparatively slowly. First, nucleation in the irradiated region must occur, then extension takes place up to the edge of the irradiated region. Since a high-coercive material should be used, (see above) the extension proceeds slowly.

In addition to the described device for storing data, devices are known (see, for example, the U.S. Pat. No. 3,460,116), which use the property of magnetizable materials which have an easy axis of magnetization normal to the surface. In certain circumstances cylindrical magnetic domains, the magnetization of which is directed opposite to that of the surroundings, can be produced in these materials, and can be moved to desired positions. Such devices suffer from the drawback that the generation, one by one, of cylindrical magnetic domains, the creation of stable positions, and the movement of magnetic domains towards said positions, requires complicated means.

The device for storing data according to the invention does not exhibit the above-mentioned drawbacks, and is characterized in that the data storage places are present in the form of a periodic stucture of cylindrical magnetic domains. The direction of magnetization of these domains is opposite to the direction of magnetization of the remaining places. The magnetization device is designed to produce a magnetic field having a field strength at which cylindrical magnetic domains, having both a circular cross-section and an elongate cross-section, but differing in area, can exist in the plate. The temperature control device is designed to keep the plate at a temperature unequal to the compensation temperature, and the address system is designed to instantaneously increase the temperature at the area of at least one magnetic domain by means of a beam of radiation energy.

As already noted, stable cylindrical domains can occur in thin plates of ferrimagnetic material having an easy axis of magnetization normal to the plane of plate, when such a plate is present in an external magnetic field H which is parallel to the easy axis of magnetization. The direction of the magnetization within a magnetic domain then is opposite to that of the field. It has been found that when such a plate comprises many magnetic domains, these domains preferably order in a periodical lattice structure. The cylindrical domains may have a circular cross-section (and are then termed "bubbles"), or an elongate cross-section (and are then termed "strips"), dependent upon the value of the reduced field $h = H/4\pi M_s$. At a given value $h_0$ of the reduced field, a bubble can change into a strip if the value of $h$ decreases and, conversely, a strip, can change into a bubble, if the value of $h$ increases.

The device for storing data according to the invention is based on the discovery that a reduced field $h_0$ can be found in which both bubble domains and strip domains occur is inherent to materials in which cylindrical magnetic domains can occur. This means that the conversion of a strip into a bubble, and the conversion of a bubble into a strip, respectively, shows a hysteresis.

Variation of $h$ about the value $h_0$, by traversing of the hysteresis loop, is possible with a constant bias field H, if the saturation magnetization $M_s$ is varied. It is known that the magnetization strongly depends upon the temperature in the proximity of the compensation point.

If now a plate of a suitable ferrimagnetic material comprises a periodic structure of bubbles, and if the reduced field has the value $h_0$, then it is possible, by selectively heating the plate by means of a light beam, to cause an irradiated bubble to change into a strip. The strip first expands but ultimately assumes the dimensions associated with the field $h_0$, when the light beam is removed. The surrounding bubbles will prevent a strip formed from a bubble to develop too strongly. In this manner, binary information can be provided in the form of strips and bubbles. Reading takes place in known manner by means of a polarized light beam of low intensity. Actually, a strip forms a larger "white" surface than a bubble. The difference in area may be a factor of 2 or 3.

A preferred embodiment of the device for storing data according to the invention is characterized in that the plate comprises a period structure of cylindrical magnetic domains having a circular cross-section, and in that the temperature control device is disigned to keep the plate at a temperature above the compensation point. Upon selective heating by means of a light beam, the magnetization at the area of a bubble can be increased, as a result of which the irradiated bubble is changed into a strip, as described above.

In addition, it is possible to create a periodic lattice structure of strip-shaped magnetic domains, for example, by first making a bubble lattice with a field $h_0$, reducing the field, and then increasing it to $h_0$. When a plate having a "strip"-lattice is maintained at a temperature below the compensation temperature, an irradiated strip will change into a bubble upon local heating, as a result of which $M_s$ decreases.

A further preferred embodiment of the device for storing data according to the invention is characterized in that a magnetization device is present for erasing stored information, with which device a magnetic field having a reduced field strength which exceeds $h_0$ can be produced in at least a part of the plate for a short period of time. By this "field pulse" the recorded strips again change into bubbles at the field $h_0$, and data can be stored again.

Conversely, in the case of a strip lattice, recorded bubbles can be converted back into strips at the field $h_0$ by reducing the bias field for a short period of time.

A further preferred embodiment of the device according to the invention is characterized in that the address system is designed to increase the temperature at the area of a number of adjacent magnetic domains. The advantage hereof is that, if a plate is used which comprises a lattice structure of very small bubbles (for example bubbles having a cross-section of 1 $\mu$m), the position of a single bubble is not decisive of the data storage place, but of the deflection and address system.

The invention will be described in greater detail with reference to the drawing.

FIGS. 4*a*, 4*b* and 4*c* are plan views of a plate of ferrimagnetic material used as a data storage element.

FIG. 5 shows a device for the storage of data according to the invention.

The hysteresis which occurs at the strip-bubble conversion and the bubble-strip conversion, respectively, is illustrated with reference to FIG. 1, which shows the relationship between the reduced field strength $h = H/4\pi M_s$, and the eccentricity $\epsilon$ of a magnetic domain in a plate of ferric magnetic material of the composition $Gd_{2.32}Tb_{0.59}$ $Eu_{0.09}Fe_5O_{12}$. This plate had a thickness $t = $ 40 $\mu$m, and was placed in a magnetic field of field strength $h_0 = 77.2$ Oe normal to the surface at a temperature of 20°C (the compensation temperature is −14.5°C). In these circumstances, $4\ \pi M_s = 100$ Gauss, and the energy of the Blochwall per unit of surface $\delta_w = 0.03$ erg/cm², so that the material parameter $l/t = \delta w/40\pi\ M_s \cdot t = 0.01$, and the reduced field strength $h = 0.772$. A magnetic domain of a circular cross-section ($\epsilon = 1$) or bubble, is in these circumstances characterized by the point A on the $\epsilon - h$ curve. When the magnetization increases by selective heating of the bubble by means of a light beam, $h$ decreases and the point A thus moves to the left, the cross-section of the bubble increasing. This effect is still intensified by the fact that the material parameter $L/t$ varies simultaneously, as a result of which the $\epsilon - h$ curve moves to the right relative to the $h$ axis. For simplicity, this effect will not be considered hereinafter. When $h = 0.765$, the bubble changes into a strip (eccentricity $\epsilon > 1$). When $h$ still further decreases, said strip grows and the shape becomes more pronounced. When the light beam is removed, the irradiated place cools, as a result of which $M_s$ and the size of the strip decrease, and $h$ increases until the starting value $h_0$ is reached. In the place of the original bubble, a strip is now present having dimensions associated with $h_0$, which is characterized by the point B on the $\epsilon - h$ curve. This strip changes into a bubble again only at $h = 0.78$.

Figure 2:
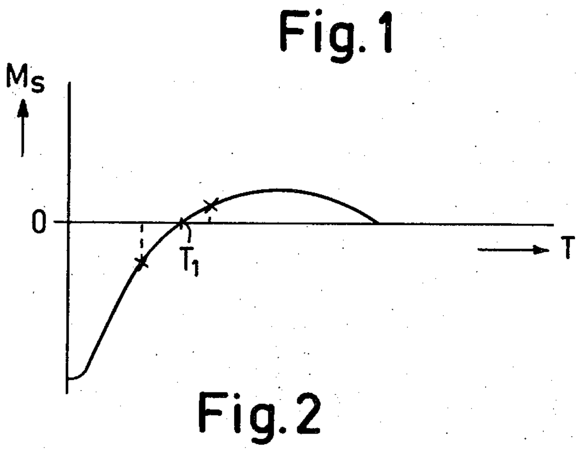
FIG. 2 is a graph showing the general relationship between the magnetization and the temperature of ferrimagnetic materials.

The temperature dependence of the magnetization is explained with reference to FIG. 2, in which the temperature T is plotted on the horizontal axis, and the saturation magnetization $M_s$ is plotted on the vertical axis. $M_s$ is the resultant of two positive sub-lattice magnetizations, which at the temperature $T_1$ (the compensation temperature) are equal to each other in value. When a magnetisable material having such a compensation temperature is kept at a temperature above $T_1$, $M_s$ will increase upon heating, whereas when the material is kept at a temperature below $T_1$, $M_s$ will decrease upon heating.

Figure 1:
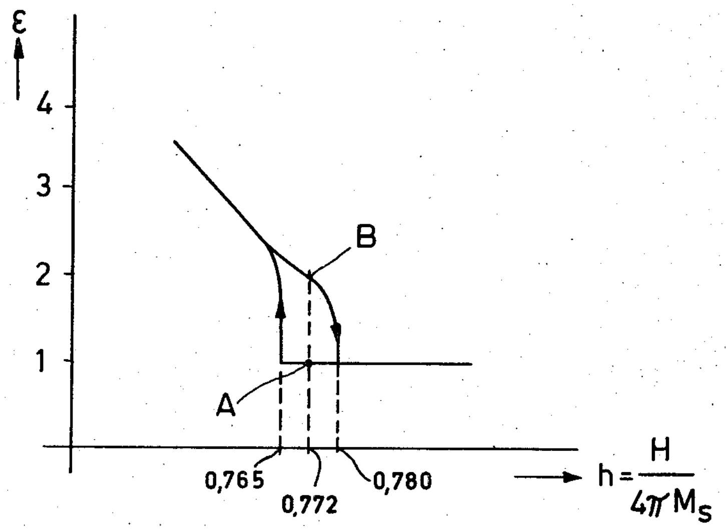
FIG. 1 is a graph showing the relationship between the shape (expressed as eccentricity $\epsilon$) of a magnetic domain, and the — (reduced) — magnetic field $H/4\pi M_s$ for a given value of the material parameter L/t.

Referring to FIG. 1, this means that if the plate $Gd_{2.32}Tb_{0.59}Eu_{0.09}Fe_5O_{12}$ is kept at a temperature below −14°C, a strip (characterized by point B on the curve) will change into a bubble (characterized by point A on the curve) by selective heating and subsequent cooling. The strip associated with point B has an area which is 2x as large as the bubble associated with point A. For the strip-bubble conversion, a pulsatory light beam having a pulse duration of 10 microseconds and an energy of 70 mWatt was necessary. The cross-section of the beam was 30 microns, and the diameter of the bubble was 14 micron.

Figure 3:
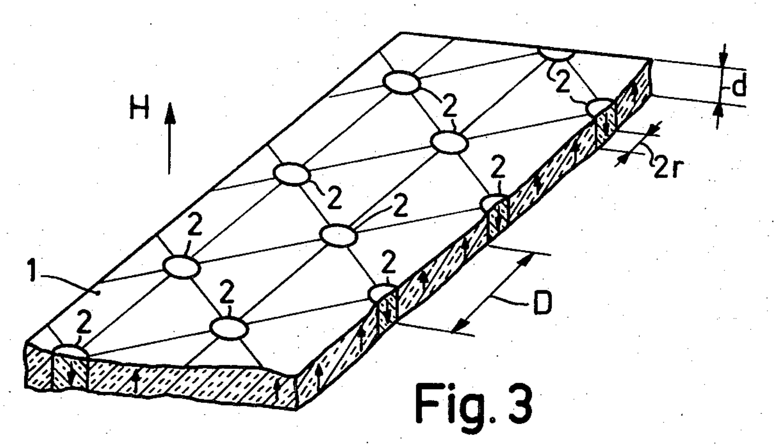
FIG. 3 is a perspective view of a plate of ferric magnetic material which comprises a periodic structure of magnetic domains.

For use in a device for data storage according to the invention, a periodic lattice structure of bubbles should be present in the above-described plate. A perspective view of such a plate 1 is shown in FIG. 3.

The plate 1 is in a bias field H which is normal to the surface, and it has a number of cylindrical magnetic domains (2) having a circular cross-section. The direction of the magnetization within the domains is opposite to that of the field H. When a sufficient number of said domains or bubbles are present, it appears that they order in a hexagonal lattice. The minimum distance which said bubbles can assume relative to each other depends upon the values of the field $h_0$. To clarify said periodic structure, connection lines between the bubbles (2) are shown in the figure. For producing said lattice, a current conductor bent to a circular loop was used through which a pulsatory current of 100 A was conveyed with a pulse duration of 3 microseconds and a repeat frequency of 50 Hz. Under the influence of the nonhomogenous field existing near the edges of the loop, the serpentinelike pattern of magnetic domains present in the plate with a field H is produced in a vehement movement. When the loop is gradually moved away from the plate, a region is created in which the pulsatory field is no longer strong enough to shake the structure of magnetic domains. A regular pattern of bubbles remains in said region. In the above-described circumstances for a plate $Gd_{2.32}Tb_{0.59}Eu_{0.09}Fe_5O_{12}$ having a thickness of 40$\mu$m, this is a hexagonal lattice having a lattice distance $D = 48$ $\mu$m and a bubble diameter $2r = 14$ $\mu$m.

A part of the upper surface of such a plate 3 having a rectangular arrangement of bubbles (4) is shown in FIG. 4*a*. At the area of the bubble 4', light is irradiated with a beam cross-section of 30 $\mu$m. As is shown in FIG. 4*b*, said bubble changes into a strip 5. The surface ratio of strip to bubble is 1 : 2. Note that this holds after the light beam has been removed and the irradiated plate is cooled.

FIG. 4*c* is a plan view of the same plate 6 in which, however, the diameter of the bubbles (7) is very small, for example, 1 $\mu$m. Within the light spot *b*, a number of bubbles are simultaneously received and transformed into strips. This has the advantage that the data storage places in the plate are determined by the address system of the light beam, and not by the place of the bubble in the plate.

FIG. 5 shows a device for data storage according to the invention shown partly schematic. The device comprises a data storage unit 8 having a plate of a magnetizable material 9 with a periodic structure of (circular) cylindrical magnetic domains according to FIG. 3, which is mounted on a plate 10. The magnetizable material has the composition $Gd_{2.32}Tb_{0.59}$ $Eu_{0.09}Fe_5O_{12}$, and is kept at a constant temperature of 25°C by means of the temperature control device 11 connected to the plate 10. The coil 12 is energized in such manner that the plate 9 is present in a field having a field strength of 77.2 Oe. For recording the data to be stored, the device comprises a source of radiation 13. This may be, for example, a laser. By means of this source, radiation pulses are produced which are passed through the semi-transparent mirror 15, and after focusing by the lens 14 and deflection by the deflection device 16, impinge upon a selected place, or address, of the plate 9. In this place are present one (compare FIG. 4*a*) or more (compare FIG. 4*c*) bubbles which changes into a strip or change into a number of strips, as a result of the temperature increase produced by the incident radiation. After termination of the radiation, a strip remains in the place of a bubble having a size which is associated with the field produced by the coil 12. The selection of a place is ensured by the address device 17. Binary information is also supplied to the device by which it is determined whether a selected place is or is not irradiated, that is to say, whether a bubble is transformed into a strip or not. Since for the storage of data, it is only important that the field produced by the coil 12 has a fixed value at which both strips and bubbles can occur, the coil 12 may be replaced, if desired, by a permanent magnet. Erasing of stored data, that is to say, the retransformation of strips into bubbles, or conversely, is possible by increasing or decreasing, for a short period of time, the magnetic field in which the plate 9 is present. This is done preferably by means of a magnetic field produced by a suitably proportioned auxiliary coil. This makes it possible in particular to erase the data on the plate at will only for a part. For that purpose, the plate is subdivided into sections, and an auxiliary coil is provided around each section separately. For reading the stored data, a polarizer 18 is arranged between the deflection device 16 and the plate 9. An analyser 19, a lens 20, and a photoelectric cell 21, in this succession, are arranged on the other side of the plate 9. Furthermore, a separate source of radiation 22 is present for supplying a beam of radiation of lower energy then source 13, since it is not desirable that the plate 9 be heated by the reading beam. It is achieved by means of the semi-transparent mirror 15, that the beam of the source 22 impinges upon the deflection device 16 in the same place as the beam from the source 13. The analyser 19 is rotated so that the light which is passed by the parts of the plate 9, which do not constitute data storage places, is extinguished. So only light impinges upon the photo-electric cell 21 which is passed by the parts of the plate where a magnetic domain is present. Since a strip-shaped domain has an area which is twice as large as a circular domain, it can thus be determined by means of the photo-electric cell, with reference to the quantity of light passed, whether a strip or a bubble is present in an addressed place, that is to say, whether a 0 or a 1 is written.

What is claimed is:

1. A device for magnetic storage of data, comprising:

a plate of ferrimagnetic material having an axis in which the material is easily magnetized, said axis being substantially normal to the plane of the plate, said material having a compensation temperature for magnetization, said plate having a number of data storage places which are disposed in the plate in the form of a periodic structure of cylindrical domains, said domains having a direction of magnetization which is opposite to that of surrounding areas in said plate;

means disposed in proximity to said plate for magnetizing the plate, said means having a magnetic field with a field strength at which cylindrical magnetic domains can exist in the plate with both a circular and elongate cross-section for storing binary information, but wherein domains of circular and elongate cross-section differ in area;

at least one source of radiation for supplying radiation to said plate;

means for controlling the temperature of the plate so as to maintain said plate at a temperature other than said compensation temperature;

deflector means disposed in a radiation path between said radiation source and said plate for directing the radiation to discrete areas of said plate, said areas of radiation containing at least one domain, said radiation increasing the temperature of the radiated areas; and address means connected to and controlling said deflector, whereby the deflector means will direct said radiation to a chosen area of said plate.

2. The device as claimed in claim 1, wherein the plate comprises a periodic structure of cylindrical magnetic domains having a circular cross-section and wherein the temperature control means keeps the plate at a temperature which lies above the compensation temperature.

3. The device as claimed in claim 1, wherein said magnetizing means has a magnetic field having a reduced field strength exceeding a given value in at least a part of the plate for a short period of time.

4. The device as claimed in claim 1, wherein the address means can increase the temperature at an area of said plate containing a number of adjacently disposed magnetic domains.

* * * * *